United States Patent
Grouell et al.

[19]

[11] Patent Number: 5,912,799
[45] Date of Patent: Jun. 15, 1999

[54] MULTIPLE DISK DRIVE STORAGE ENCLOSURE WITH VENTILATION

[75] Inventors: William Grouell, San Ramon; Michael McCormick, San Jose; Craig M. Leveralt, Mountain View; Ronald Barnes, Livermore, all of Calif.

[73] Assignee: Sun Microsystems, Inc., Mountain View, Calif.

[21] Appl. No.: 08/674,027

[22] Filed: Jul. 1, 1996

[51] Int. Cl.[6] .................................. G06F 1/16; H05K 7/20
[52] U.S. Cl. ...................... 361/685; 361/692; 312/223.2
[58] Field of Search .................................... 361/683–686, 361/724–727, 687, 692, 690, 694, 695; 312/334.1, 334.8, 334.23, 349, 350, 223.2; 360/97.03, 98.01; 364/708.1; G06F 1/16

[56] References Cited

U.S. PATENT DOCUMENTS

| | | | |
|---|---|---|---|
| 3,192,306 | 6/1965 | Skonnord | 361/692 |
| 3,231,785 | 1/1966 | Calabro | 361/692 |
| 4,447,856 | 5/1984 | Takahashi et al. | 361/692 |
| 4,754,397 | 6/1988 | Varaiya et al. | 361/685 |
| 4,918,572 | 4/1990 | Tarver et al. | 361/736 |
| 5,112,119 | 5/1992 | Cooke et al. | 312/283 |
| 5,227,957 | 7/1993 | Deters | 361/685 |
| 5,268,637 | 12/1993 | Liken et al. | 361/692 |
| 5,332,306 | 7/1994 | Babb et al. | 312/334.16 |
| 5,340,340 | 8/1994 | Hastings et al. | 439/64 |
| 5,435,737 | 7/1995 | Haga et al. | 439/157 |
| 5,490,723 | 2/1996 | Driscoll et al. | 312/334.28 |

*Primary Examiner*—Lynn D. Feild
*Attorney, Agent, or Firm*—Julian Caplan; Flehr Hohbach Test Albritton & Herbert LLP

[57] ABSTRACT

An enclosure is assembled from metal-plated rigid structural foam plastic components to house in minimal space in many hard disk drives. Major components, including the power supply, plug directly to a motherboard at the rear of the enclosure, eliminating internal cables. The parts fit together in snap-in fashion in such manner that the back will not close if parts are not installed properly. For ventilation, slots are formed in the sides and a central partition which permit air from fans on one side to flow laterally across all the disk drives and then out through slots in the opposite side. A side facing door permits easy access to all drives simultaneously for service and upgrade.

13 Claims, 7 Drawing Sheets

MULTIPLE DISK DRIVE STORAGE ENCLOSURE WITH VENTILATION

BACKGROUND OF THE INVENTION

1. Field of the Invention

This invention relates to a new and improved multiple disk drive storage enclosure. More particularly, the invention relates to a housing for multiple disk drives in a peripheral device such as one for SCSI hard disk storage wherein a maximum number of drives may be stored in a minimum space.

2. Related Art

Add-on disk storage devices are very common in the computer industry. However, most of these drives require separate power supply and enclosure for the various drives. The present invention differs from these structures in that separate enclosures for each drive within the main enclosure are not required, and as a result, in the present invention the size and complexity of the unit is considerably reduced.

SUMMARY OF THE INVENTION

The present invention is an enclosure which, for example, may be used for a peripheral device containing SCSI hard disk storage. The enclosure houses many drives close together and therefore requires minimum space.

The structure of the enclosure is made up of metal plated rigid structural foam plastic components which permit placing the components closer together than sheet metal components can be placed. In addition, the metal on the components provides grounding and EMI containment.

An internal transverse vertical center partition divides the area for disk drives into two compartments, each of which receives multiple disk drives. Tracks are formed on each side of the partition and on facing surfaces of front and rear chassis ends. Rails on the partition and ends comprise slides to receive and guide the disk drives.

Another feature of the invention is the provision of slots in the chassis and in the partition through which air flows over all of the disk drives and the motherboard, as well as the power supply and out through suction fans at the rear, permitting minimum spacing between the drives without overheating and thereby economizing on space.

Another feature of the invention is the fact that internal cables are completely eliminated because all major components including the power supply plug directly into a motherboard in the enclosure. The power supply plugs into the rear of the enclosure and is retained by fasteners for the rear cover. The disk drives have connectors which likewise plug into connectors on the motherboard.

The device is provided with a side facing door (which may be locked) and when opened permits easy access to all of the drives for service or upgrade. The door has a metal lining or shield which makes electrical contact with the metalized chassis. Switches, LED indicators, I/O connectors and the like are located on the power supply or on the back plane of the motherboard. There are internal LED indicators which are redundant to front LED indicators and made visible when the enclosure door is open by light pipes transporting light through the structural foam partition to an internal indicator panel.

Still another feature of the invention is the fact that the chassis is mounted on shock absorbing cup-shaped feet of rubber or rubber-like material. Slots are formed across the lips of the cups to prevent suction on the supporting surface interfering with movement of the device.

A front grill is provided which snaps onto the chassis by means of special bosses and sockets as hereinafter described for easy assembly.

The door of the device will not fit into place if any of the parts are not properly assembled, thereby preventing damage by reason of carelessness of assembly.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figures 1, 1A:
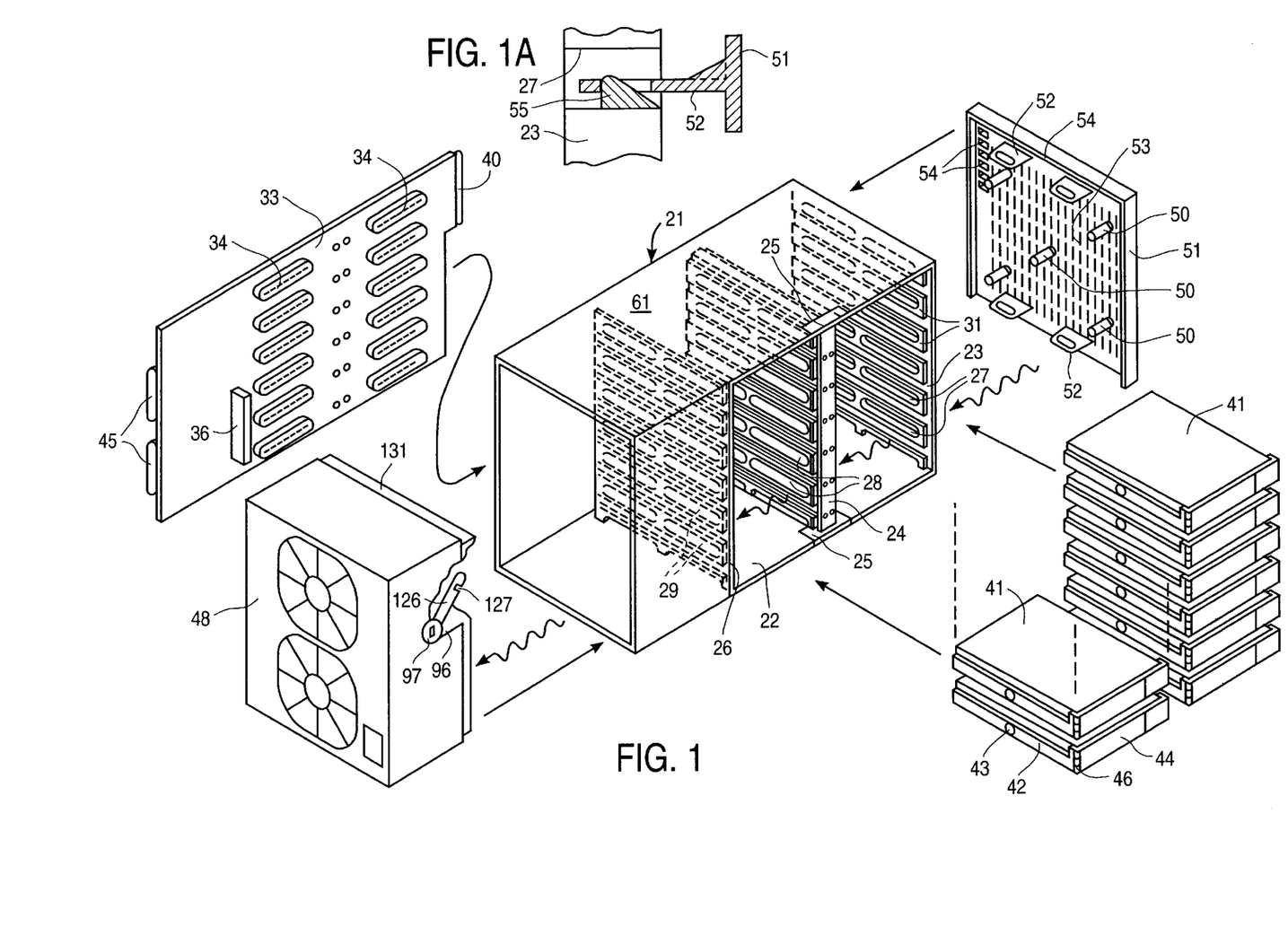
FIG. 1 is an exploded perspective view of the major components of the device.
FIG. 1A is an enlarged fragmentary sectional view showing attachment of the front panel.
Figure 3:
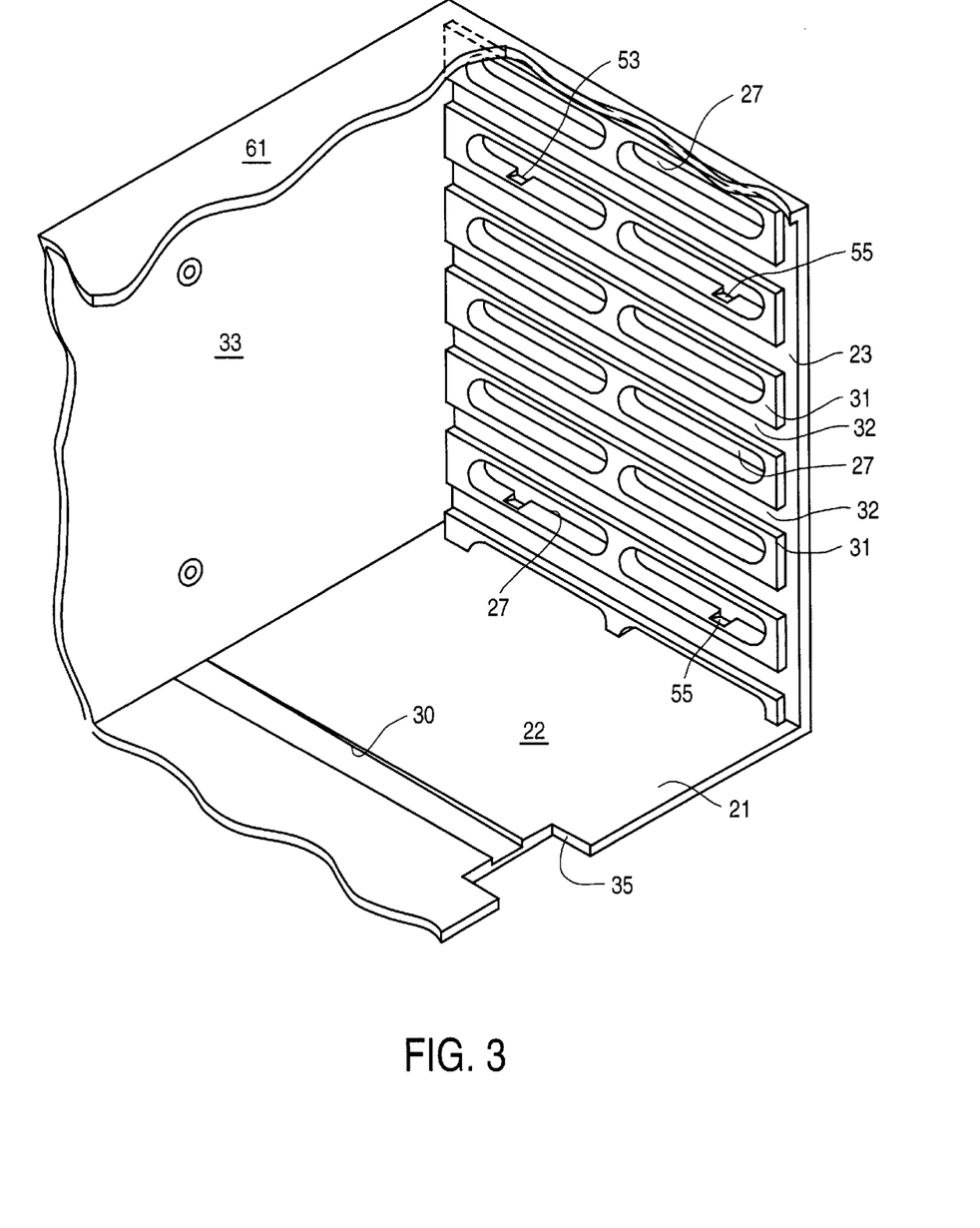
FIG. 3 is a partially broken away perspective view of a side and portions of the bottom, back and top of the chassis.

The enclosure of the present invention employs a chassis 21 made of metal-plated rigid structural foam plastic having a base 22. Rubber or rubber-like feet 18 in the form of inverted cups are attached to base 22. Slots 19 are formed in the bottom edges of feet 18 so that the feet do not attach to a supporting surface by vacuum. Projecting upwardly from base 22 is a front partition 23. Spaced from the rear of chassis 21 is a second or rear partition 26 projecting upwardly from the chassis. The inner edge of partition 26 is spaced from side panel 66 to provide room for motherboard 33. The inner edge of center partition 29 likewise is spaced from side panel 66 to provide room for motherboard 33. Center partition 24 slides into chassis 21 and has top and bottom feet which engage in slots 30 in base 22 and top 61 (not shown but similar to bottom slot 30 shown in FIG. 3) to hold partition 29 vertical. Notch 35 (see FIG. 3) limits inward movement of partition 24.

Guide bosses 31 are formed in front partition 23 extending from side to side of the chassis with spaces 32 between bosses 31 constituting tracks to receive the disk drives 41 hereinafter described. Horizontal slots 27, 28, and 29 are formed in guide bosses 31 of front partition 23, center partition 24 and partition 26, respectively, for ventilation.

A motherboard 33 extends vertically upwardly from base 22 behind the inner edges of partitions 24 and 26. Motherboard 33 has a plurality of pin connectors 34 in alignment with the spaces 32 between bosses 31 for reception of the pins (not shown) on the inner edges of disk drives 41.

Attached to the inner face of motherboard 33 is a power supply connector 36. Motherboard 33 is of extended length so that the rear portion thereof extends between the partition 26 and the rear of chassis 22 so that connectors 45 are exposed for connection to other equipment. A part of the front portion of motherboard 33 which may be observed at the front of the enclosure extends forwardly as an LED panel 40.

Figure 2:
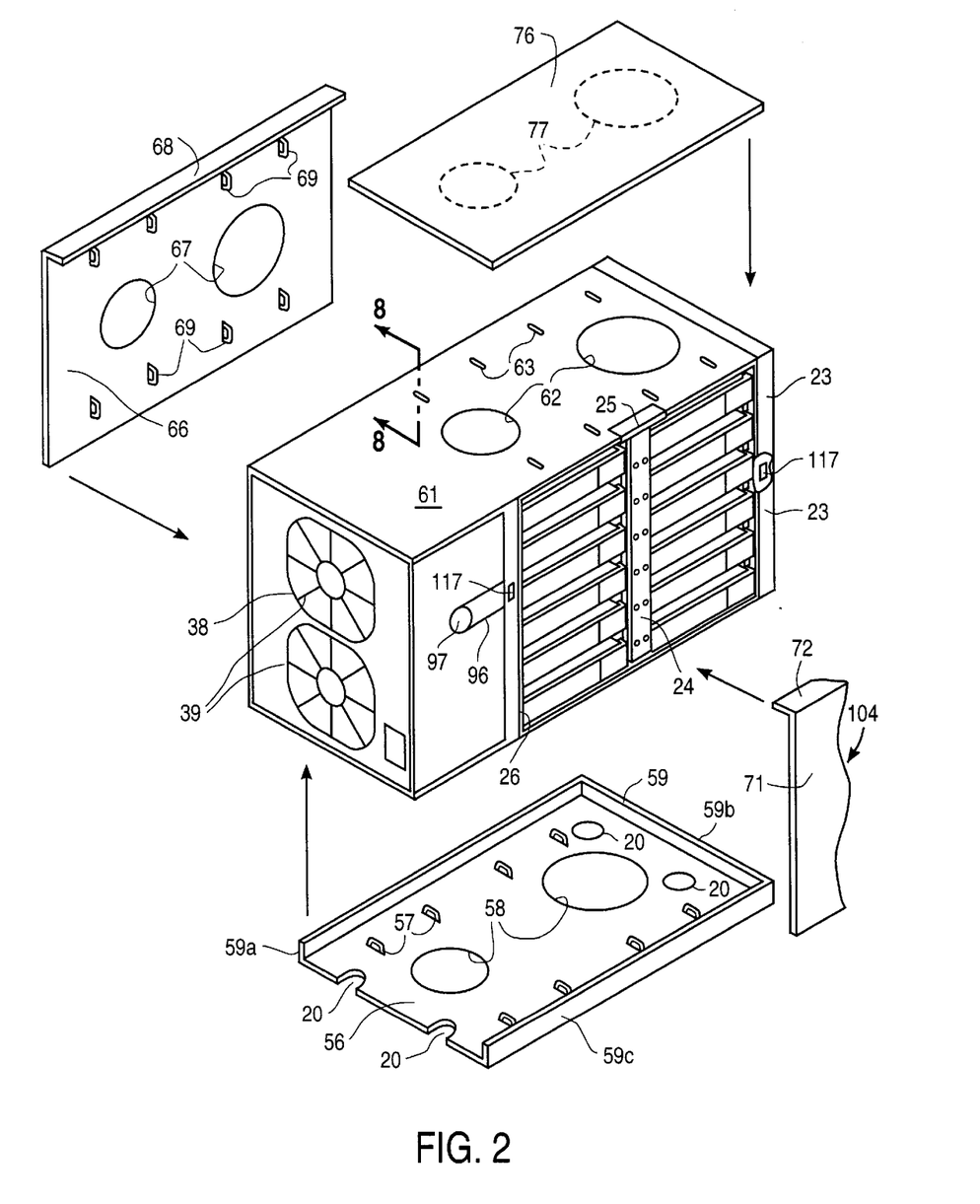
FIG. 2 is another exploded perspective view showing the components of FIG. 1 assembled and also showing the major external components prior to assembly.

The space within chassis 21 rearward of partition 26 is for reception of power supply 38 containing fans 39 (see FIG. 2). When the power supply 38 is installed inside the chassis 22, the fans pull air through air slots 53 in front panel 51 and then through slots 27, 28 and 29 in order to cool the disk drives 41 positioned in the spaces 32 between bosses 31 and also across motherboard 33 as well as the power supply components in housing 38. Rear cap 48 fits over the rear of chassis 21 and encloses the rear of power supply 38. See FIG. 1.

Disk drives 41 may be installed in tracks 32 between bosses 31. Grommets 43 project outwardly of tracks 42 to cushion the drives and also properly locate the drives 41 in position so that the pins on the inner edges thereof connect with the connectors 34 on motherboard 33. Fronts 44 are connected to one of the side tracks 42 by hinges 46 and the other ends of front 44 latch onto the side guide 41 (not shown).

Front panel 51 formed with air slots 53 is positioned spaced forwardly of front partition 23 by bosses 50 which engage partition 23. Windows 54 are in alignment with LED panel 40 so that illumination thereof is observed through the front of the enclosure. A plurality of lugs 52 which are apertured at their inner ends extend inwardly from front panel 51 and snap over catches 55 on the horizontal surfaces of some of the slots 27.

Bottom 56 is positioned below base 22 and is provided with a plurality of upward extending lugs 57. Depressions (not shown) are formed in base 22 and embossments 58 on bottom 56 fit into the depressions to locate bottom 56 relative to base 22. It will be noted that depressions 62 are of different size to prevent panel 76 from being reversed.

Figure 8A:
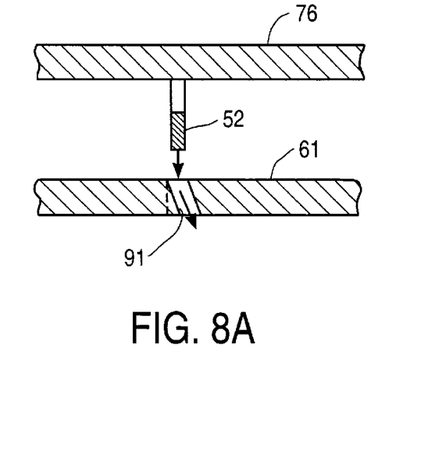
FIG. 8A and FIG. 8B are enlarged fragmentary views showing assembly of components.
Figure 8B:
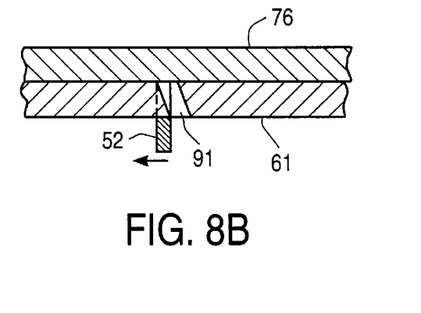

Top 61 of the chassis 21 is provided with depression 67 and slots 63. Top panel 76 is formed with embossments 77 which fit into depressions 62 to locate panel 76 relative to top 61. As shown in FIGS. 8A and 8B, top panel 76 is formed with a slanted slot 91. When the top panel 76 is pressed downward on top 61 the lug 52 is bent to the right as viewed in FIG. 8A until it fits through the slot 91 whereupon it assumes a vertical position as shown in FIG. 8B and holds the parts 61 and 76 assembled. Similar lugs 57 fit into slanted slots (not shown) in base 22.

Side panel 66 fits behind the side of chassis 21. It is provided with depressions 67 in an outwardly extending flange 68 which fits over the top 61 of the chassis. Apertured lugs 69 also project from the side panel 66 and are received in slanted slots in the same way as lugs 52 of end 76 is received in top 76, as illustrated in FIGS. 8A and 8B.

Side door 71 closes off and secures in place the disk drives 41 when they are positioned in the spaces 32. Door 72 has an upper edge 72 which fits over the top of the chassis 22.

Figure 4:
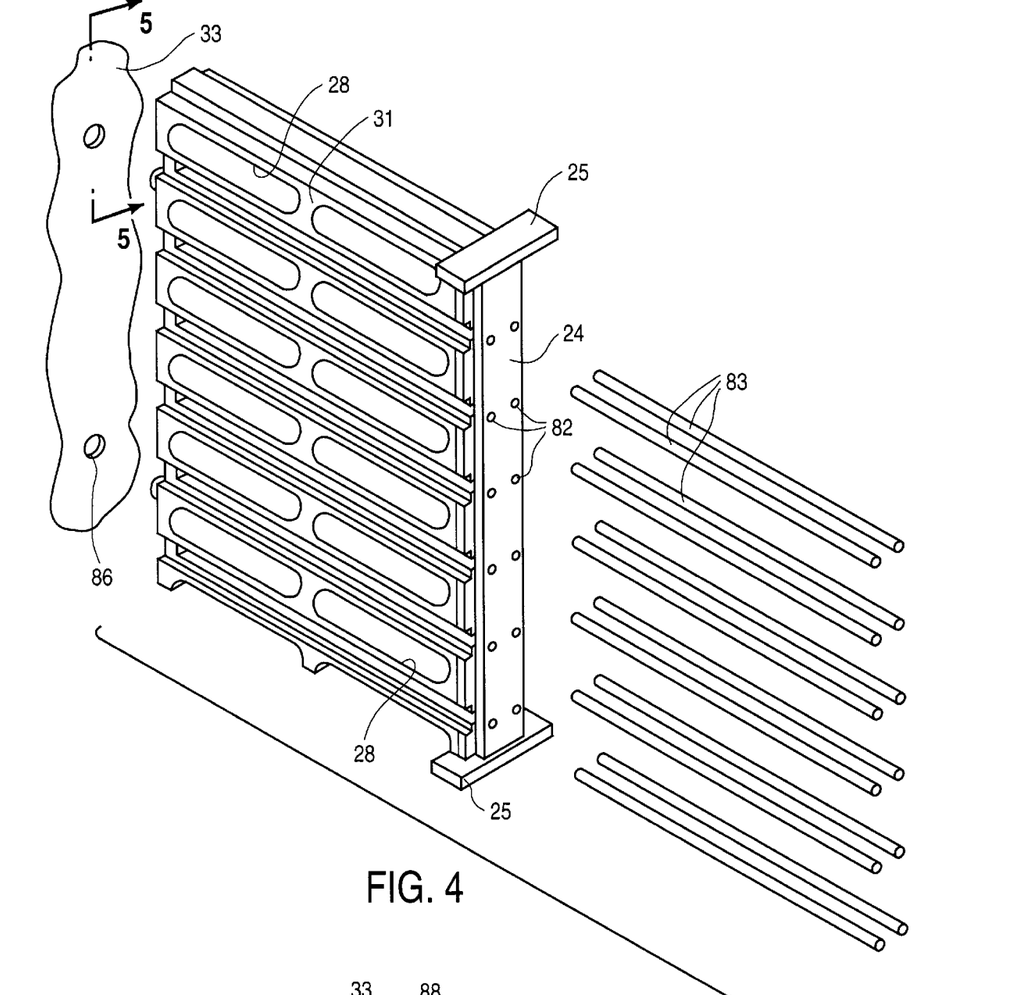
FIG. 4 is an exploded perspective view showing light pipes interconnecting the back panel and extending through the partition.
Figure 6:
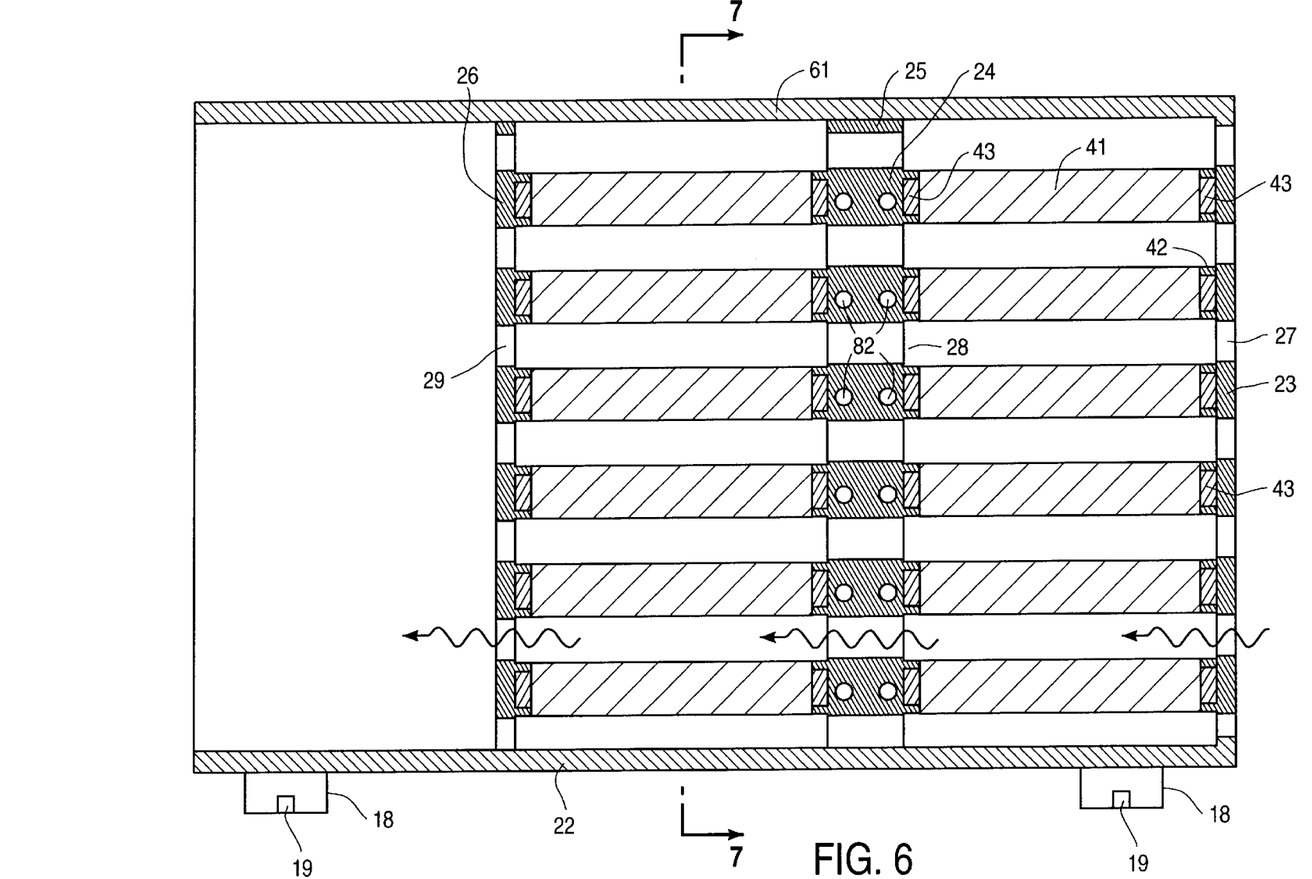
FIG. 6 is a transverse vertical sectional view showing the path of air across the disk drives for cooling purposes.
Figure 7:
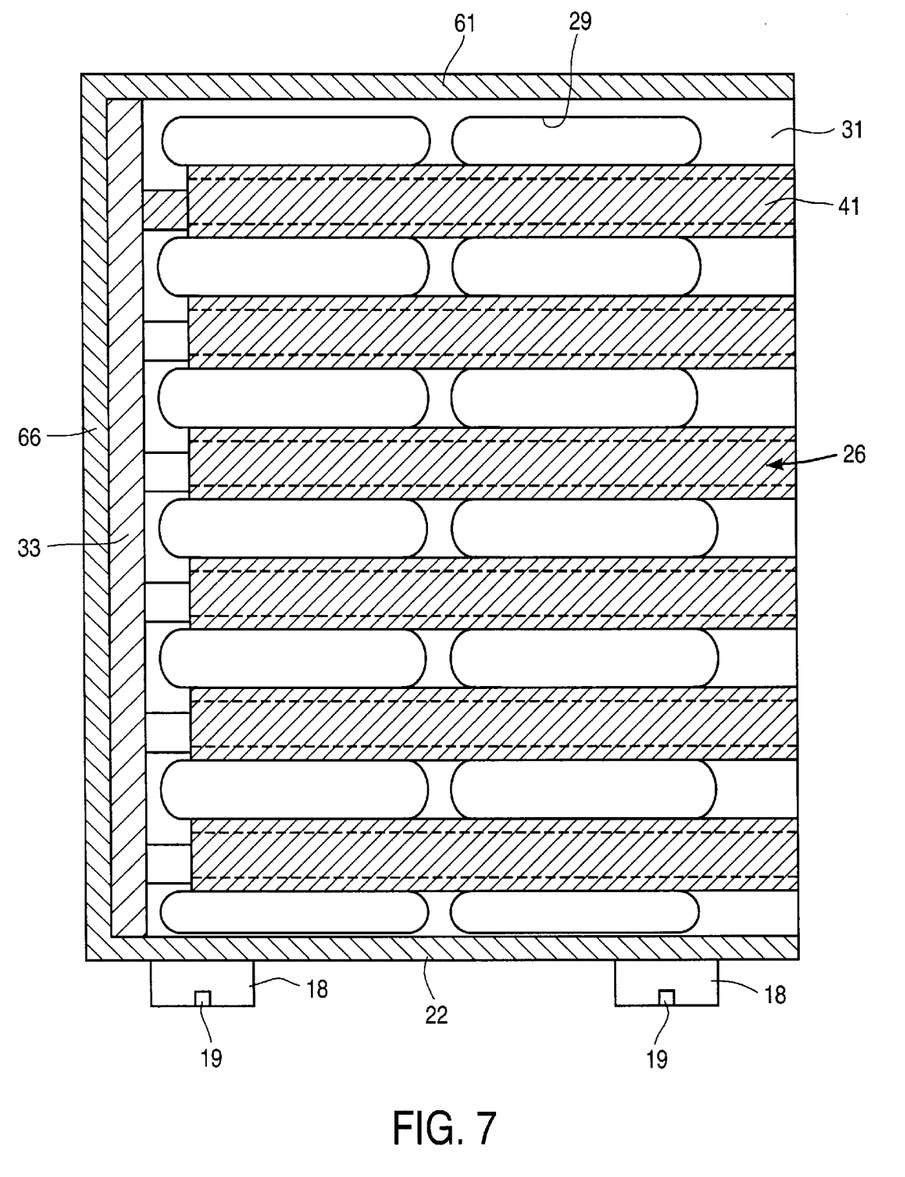
FIG. 7 is a sectional view taken substantially along the line 8—8 of FIG. 2.

Directing attention now to FIGS. 4 and 6, motherboard 33 is formed with a plurality of holes 82 which are aligned with holes in center partition 24. Fiber optic rods 83 fit through the holes 82. LEDs 81 in alignment with the fiber optic rods 83 project light outward so that they are visible from the open side of the chassis 22 when door 104 is open.

Figure 5:
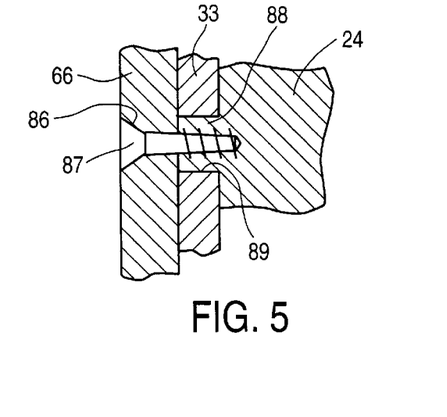
FIG. 5 is an enlarged sectional view taken substantially along the line 5—5 of FIG. 4 showing attachment of the partition to the back board.

In order to assemble partition 24, as best shown in FIG. 5, holes 86 are formed in the side panel 66 in alignment with holes 89 in motherboard 33. Bosses 88 integral with center panel 24 fit into holes 89. The parts are assembled by means of screws 87 attaching side panels 66, motherboard 33 and center partition 24.

Slotted vertical edges 59a, b, c are formed on bottom panel 56. Into these fit the lower edges of side panel 66, front panel 51 and door 71, respectively. Inturned flanges 68 on side panel 66 and inturned flange 54 on front panel 51 fit over top 61 of chassis 21 and under top panel 76. In addition, the inner edge of the top of rear cap 48 fits under top panel 76.

Figure 9:
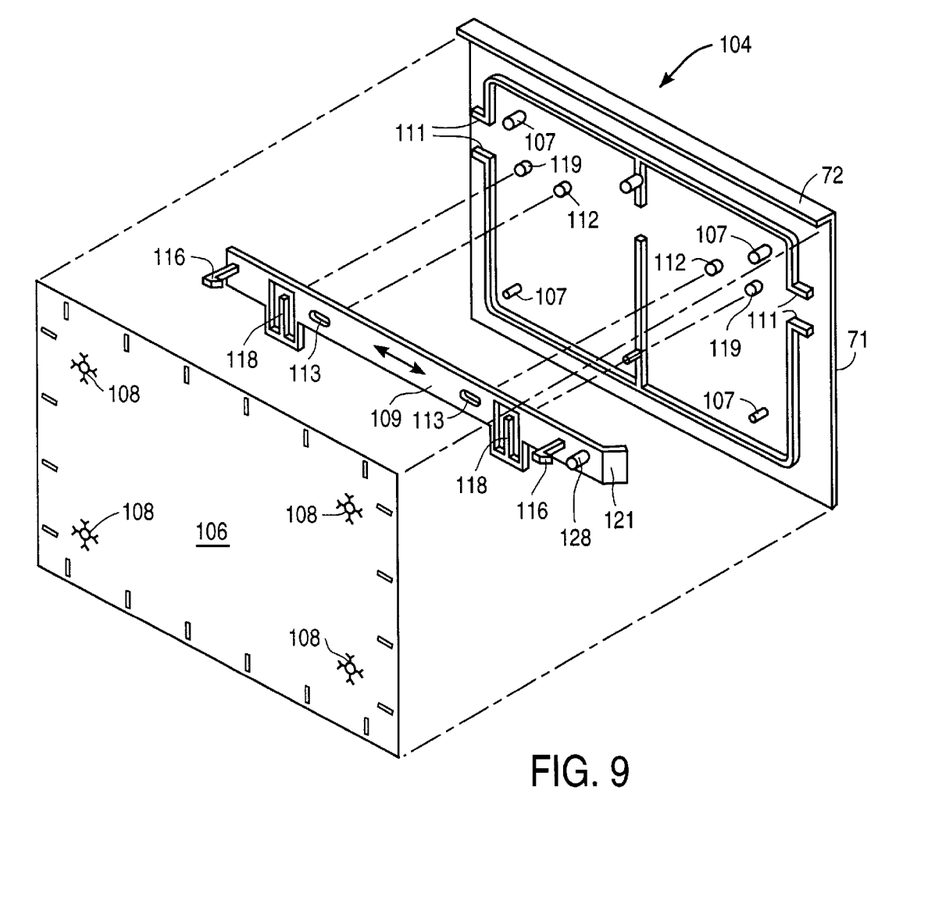
FIG. 9 is an exploded perspective view showing components of the door.

As illustrated in FIG. 9, side door 104 has an outer panel 71 attached to metallic inner panel 106 by means of studs 107 on panel 71 being received in notched holes 108 in panel 106 in the manner of Tinnerman nuts. Inner panel 106 contacts the metal plated foam of chassis 21 for grounding door 104 and EMI containment. Horizontally slidable between panels 71 and 106 is latch 109. The inner surface of panel 71 is formed with raised latch guides 111 which engage the upper and lower edges of latch 109. Further to guide latch 109, pins 112 on the inside of panel 71 fit into horizontal slots 113 in latch 109 and the lengths of slots 113 limit sliding movement of latch 109. Hook-shaped catches 116 on latch 109 engage lugs 117 on chassis 21 (See FIG. 2) to hold the door 104 in place. To bias latch 109 so that catches 116 are held in engagement with lugs 117, flexible spring fingers 118 are formed on latch 109 and are engaged by pins 119 on the inside of panel 71. When the user pulls finger grip 121 on the end of latch 109 to the right as viewed in FIG. 9, hooks 116 disengage from lugs 117. On release of grip 121, spring fingers 118 move latch 109 to the left, so that hooks 116 reengage lugs 117.

Lock 97 mounted in rear cap 48 is a key lock having a lever 126 formed with a hook 127 at its outer end to engage lock pin 128 on latch 109. Thus when lever 126 engages lock pin 128, latch 109 cannot be opened.

The parts interfit so that the proper sequence of assembly of the parts must be followed or door 104 will not close properly. Panels 56, 76, 66 and 51 may be termed metallic outer skin panels and are attached to metal plated chassis 21 as previously explained. Board 33 is inserted into the chassis 21—located inside the right side as viewed from the front (left side as viewed in FIG. 1). Center partition 24 is then slid in from the side into slot 30, foot 25 seating in cut-out 35. Screws 87 then are attached, holding partition 24 in place. The fan casing and power supply 38 are then inserted into the open back of chassis 21.

The chassis 21 is then placed on bottom 56, lugs 57 fitting into slots (not shown) similar to slots 91 in FIG. 8A. Top panel 76 is then applied to the top 61 of chassis 21 in similar manner. Right side panel 66 is likewise attached to the side of chassis 21, the lower edge thereof fitting into slotted edge 59a of bottom 56 and flange 68 fitting over the edge of top panel 76. Thereupon front panel 51 is attached, apertured lugs 52 engaging catches 55 and spacers 50 holding panel 51 a fixed distance away from front partition 23. The lower edge of panel 51 fits into slotted edge 59b of bottom 56. The top flanges 52 of panel 51 fit over the edge of top panel 76 and the right edge flange (as viewed from the front) fits over the edge of right side panel 66.

Rear cap 48 is then installed over the rear of chassis 21. It will be noted in FIG. 1 that the forward edge 131 of cap 48 is stepped inward to fit under the rearward edge of top panel 76 and side panel 66.

One or more disk drives 41 are then inserted into spaces 32. Door 104 is then installed by pushing inward and pulling latch finger grip 121 until catches 116 clear lugs 117, whereupon grip 121 is released and springs 118 cause the hooks of catches 116 to engage lugs 117, holding the door closed. The flanges on door 71 fit over the edge of top 76 and over edges 131 of cap 38. Only if all of the parts have been properly assembled will the door close.

If desired, lock 77 may be engaged to secure door 104 closed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An enclosure for a plurality of disk drives comprising a chassis having an open side, said chassis having at least two parallel partitions each formed with a plurality of opposed disk drive guides positioned with spaces between adjacent guides equal to the thickness of a disk drive, said guides being positioned to engage edges of disk drives, and a motherboard in the side of said chassis opposite said open side having a plurality of electrical connectors positioned opposite said spaces to connect to the inner ends of disk drives supported by said disk drive guides, each said guide comprising an integral boss extending outward of one said partition, said bosses having parallel surfaces substantially perpendicular to said partitions, said bosses being spaced from each other a distance equal to the thickness of a disk drive, said surfaces comprising tracks for reception of disk drives for movement of said disk drives parallel to said partitions, a third partition parallel to and intermediate said first mentioned at least two parallel partitions formed on two sides with a plurality of opposed disk drive projections spaced to engage edges of disk drives, a slitted front panel for connecting means for detachably connecting said front panel to one said partition, said connecting means comprising apertured lugs extending inwardly of said front panel and a catch mounted on said chassis to fit into apertures of said lugs.

2. An enclosure according to claim 1 which further comprises a third partition parallel to and intermediate said first mentioned at least two parallel partitions formed on two sides with a plurality of opposed disk drive projections spaced to engage edges of disk drives.

3. An enclosure according to claim 1 in which said chassis and said partitions are formed of metal plated rigid structural foam, said foam comprising electrical grounding and EMI containment.

4. An enclosure according to claim 1 which further comprises interfitting bottom, top, side, and front metallic outer skin panels and detachable means for detachably connecting said skin panels to said chassis.

5. An enclosure according to claim 1 in which said chassis opposite said open side has a plurality of electrical connectors positioned opposite said spaces to connect to the inner ends of disk drives supported by said projections and a door having a metallic panel positioned to establish electrical contract with said chassis.

6. An enclosure according to claim 1 which further comprises a slitted front panel and connector means for detachably connecting said front panel to one said partition.

7. An enclosure according to claim 1 in which said chassis and said partitions are formed of metal plated rigid structural foam, said foam comprising electrical grounding and EMI containment and which further comprises a door for said open side, said door comprising a metallic panel positioned to establish electrical contact with said chassis.

8. An enclosure according to claim 1 which further comprises a slitted front panel and connecting means for detachably connecting said front panel to one said partition.

9. An enclosure according to claim 8 which further comprises means for spacing said front panel from said one said partition.

10. An enclosure according to claim 8 which further comprises a fan and means housing said fan, said means housing said fan fitting into an end of said chassis remote from said front panel, said fan being arranged to draw air through said slitted front panel across disk drives supported by said partitions.

11. An enclosure for a plurality of disk drives comprising a chassis having an open side, said chassis having at least two parallel partitions each formed with a flat surface and a plurality of projections extending outwardly of said flat surface, said projections being positioned with spaces between adjacent projections equal to the thickness of a disk drive, the distance between adjacent flat surfaces equal to the width of a disk drive, said projections being positioned to engage edges of disk drives, said projections being formed with elongated slots in said projections extending through said partitions and said projections for air passage across disk drives supported by said projections.

12. An enclosure for a plurality of disk drives comprising a chassis having an open side, said chassis having at least two parallel partitions each formed with a plurality of projections extending outwardly of said partitions, said projections being positioned with spaces between adjacent projections equal to the thickness of a disk drive, said projections being positioned to engage edges of disk drives, said projections being formed with elongated slots for air passage across disk drives supported by said projections, interfitting bottom, top, side, and front metallic outer skin panels, and detachable means for detachably connecting said skin panels to said chassis, at least one of said detachable means comprises a flexible apertured lug fixed to one said outer skin panel and a slanted slot in said chassis, said aperture being dimensioned such that after said lug is bent to extend down through said slot, said lug straightens relative to said slot.

13. An enclosure for a plurality of disk drives comprising a chassis having an open side, a motherboard opposite said open side, said chassis having at least two parallel partitions each formed with a plurality of projections extending outwardly of said partitions, said projections being positioned with spaces between adjacent projections equal to the thickness of a disk drive, said projections being positioned to engage edges of disk drives, said projections being formed with elongated slots for air passage across disk drives supported by said projections, a third partition parallel to and intermediate said first-mentioned at least two parallel partitions formed on two sides with a plurality of projections spaced to engage edges of disk drives, an LED on said motherboard, a horizontal hole through said third partition, and a light transmitting rod in said hole positioned to transmit light from said LED to an end of said third partition remote from said motherboard.

* * * * *